May 27, 1930.    H. D. COLMAN    1,760,479
RADIANT ENERGY CONTROL SYSTEM
Filed May 4, 1927     5 Sheets-Sheet 1

INVENTOR
Howard D. Colman
BY
ATTORNEYS

May 27, 1930.  H. D. COLMAN  1,760,479
RADIANT ENERGY CONTROL SYSTEM
Filed May 4, 1927   5 Sheets-Sheet 2

INVENTOR
Howard D. Colman
BY
ATTORNEYS

May 27, 1930.   H. D. COLMAN   1,760,479
RADIANT ENERGY CONTROL SYSTEM
Filed May 4, 1927   5 Sheets-Sheet 3

INVENTOR
Howard D. Colman
BY
ATTORNEYS

May 27, 1930.  H. D. COLMAN  1,760,479
RADIANT ENERGY CONTROL SYSTEM
Filed May 4, 1927    5 Sheets-Sheet 5

INVENTOR
Howard D. Colman
BY
ATTORNEYS

Patented May 27, 1930

1,760,479

UNITED STATES PATENT OFFICE

HOWARD D. COLMAN, OF ROCKFORD, ILLINOIS

RADIANT-ENERGY CONTROL SYSTEM

Application filed May 4, 1927. Serial No. 188,856.

The invention relates, in general, to a system of control by radiant energy signalling, whereby the operation of a desired mechanism or instrumentality located at one point may be initiated under manual control from another point where conditions are such as to render impossible or impracticable the use of metallic control circuits connecting the two points.

More specifically considered the invention relates to a radiant energy control system which is especially adapted for use in the control of a power driven operating mechanism for a garage door or set of doors from a motor vehicle whether the latter is moving or stationary.

In systems such as have been used heretofore for selectively controlling an operating instrumentality at one point by the use of radiant energy signals transmitted from another point, the selection is ordinarily accomplished by the use of fields of different wave lengths, each receiver to be selected being tuned to respond only to fields of a given wave length. Such systems are capable of making only a relatively small number of different selections and are therefore impractical where a large number of similar instrumentalities such as garage door operators are to be controlled selectively. In the adaptation of a radiant energy control system to door operators, it is therefore essential to provide for a wide range of selectivity. Also where the system is to be used rather infrequently as would be the case with the operation of garage doors, it is necessary to provide a transmitter mechanism and a selector mechanism at the receiving point of the start-stop type, that is, mechanisms having driving means which are normally at rest but which may be started for operation during each signal cycle and automatically stopped at the end of the cycle. In order that the codal signal may be utilized properly for purposes of selection in systems of this type, it is essential that the transmission of the signal impulses and the distribution of the received impulses to the selector take place in timed relation. That is to say, the receiving selector must be positioned for proper operation by a given unit of the codal signal at the time when that unit of the signal is transmitted, allowance being made for the practical impossibility of maintaining absolute synchronism between the transmitter and the signal distributing mechanism.

As applied to the operation of garage doors, it is desirable to provide a radio receiving circuit for such a control system which operates constantly, that is, one which is always conditioned for the reception of impulses of the given wave length. To operate such a circuit economically, the ordinary electric power lines as distinguished from storage or dry batteries should be used both on the filament and the plate of the detector tube. It is also advantageous to provide a receiving circuit whose sensitivity is relatively low in order that the selector mechanism controlled thereby will be operated only when relatively strong energy fields or impulses are received and not in response to the ordinary radiation fields which emanate almost continuously from present day radio broadcasting stations.

The primary object of my invention is to provide a new and improved radiant energy control system for initiating the operation of a power driven door operator.

Another object of my invention is to provide a radiant energy signalling system for selective control adapted for relatively infrequent operation in that the driving means for the signal transmitter and for the receiver selector mechanism be capable of starting from a normal rest position and stopping automatically at the end of a predetermined operating cycle during which the transmitter and receiver operate in timed relation.

Still another object is to provide a radiant energy control system having a receiver of relatively low sensitivity so that it will respond only to relatively strong signals and therefore is not affected by radiation fields emanating from ordinary radio broadcasting stations.

A further object is to provide a radiant energy system for controlling a garage door operator from a motor vehicle, having a receiver with a detector tube conditioned for the reception of signals upon the approach of the vehicle to the garage.

A further object is to provide a radiant energy control system whereby the operation of a lighting circuit in a garage or other structure may be selectively controlled from a motor vehicle or the like.

A further object is to provide in a signalling system a receiver responsive to a plurality of codal signals each adapted to control the operation of any one of a plurality of doors or sets of doors selectively.

Another object is to provide a radio receiver having, in combination with a detector tube, means operating at definitely timed intervals in each operating cycle to restore the tube to its normal condition preceding the reception of each of the impulses of the signal combination which governs the operation of the selecting mechanism of the receiver.

A general object is to provide a radiant energy control system embodying transmitting and receiving apparatus of a relatively simple character, capable of easy manual operation, economical manufacture and maintenance, and yet certain in operation.

Other objects and advantages will be apparent from the following description taken in connection with the accompanying drawings wherein the invention is illustrated in its preferred embodiment. It will be understood, however, that various changes may be made, by those skilled in the art, in the construction and arrangement employed and in the particular application of the system, without departing from the spirit and scope of the invention as expressed in the appended claims. Another embodiment of the invention is shown in my copending application Serial No. 1,808, filed January 12, 1925, of which this application is a continuation in part.

*In general*

For purposes of illustration I have shown in the drawings and will hereinafter describe the invention as applied to the control of a power driven garage door operator from a motor vehicle. Generally stated the apparatus embodies a radio transmitter carried by the motor vehicle with a sending antenna mounted beneath the vehicle. A receiver including a receiving antenna and a detector tube is connected with the lighting circuit of the garage so as to be conditioned for the reception of signals transmitted from the motor vehicle when the latter is approaching the garage or is in the garage. The receiver further embodies an electromagnet in the output circuit of the tube adapted to control a selector mechanism, which in turn controls the operation of a power driven operator for the garage doors. The transmitter embodies a sending device with driving means therefor adapted to be set in operation by the operator of the vehicle by merely closing a switch conveniently located in the vehicle. Upon the closing of such a switch by the operator, the sending device is driven through a predetermined operating cycle in which a preconcerted combination of radiant energy fields and space units emanate from the sending antenna. The signal thus transmitted is picked up by the receiving antenna, and the electromagnet in the output circuit of the tube, responding to the initial impulse of the received signal first starts in operation an electric motor which drives the selector mechanism through a predetermined cycle in timed relation with the transmitter. In such operation of the selector mechanism the magnet acts in response to the remaining portion of the received signal combination to operate a plurality of selector elements selectively. If such elements are set in the proper combination, the selector mechanism operates at the end of the cycle to close a switch which initiates the operation of the power driven door operator. In the case of two doors or sets of doors to be operated, the selector mechanism is adapted to respond to either of two signal combinations so that either one or the other of the two doors or sets of doors may be operated selectively. Also the selecting mechanism may be adapted to respond to a light controlling impulse transmitted with the signal combination so as to control the operation of the lighting circuit of the garage.

Figure 1:
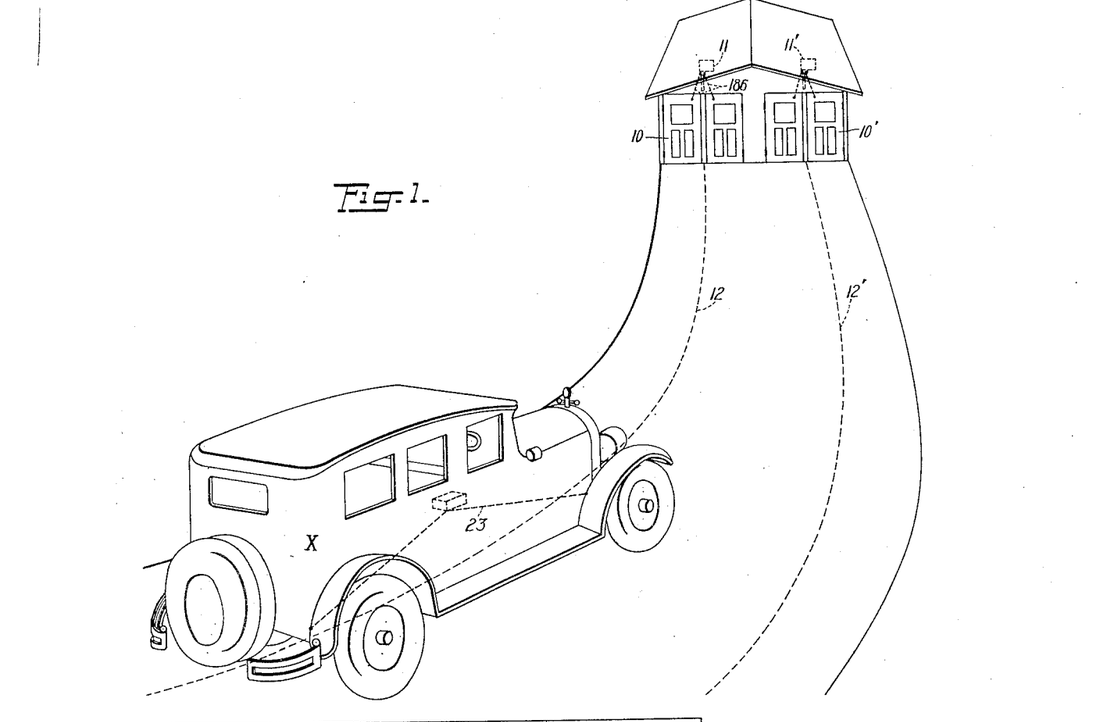
Figure 1 of the drawings is a perspective view of a garage having a driveway leading thereto and showing a motor vehicle equipped with a radio transmitter in accordance with my invention.

In the embodiment of the invention illustrated, I have shown (Fig. 1) a garage adapted to house two motor vehicles and therefore having two sets of doors 10 and 10' respectively equipped with door operators generally designated by the numerals 11 and 11'. Receiving antennæ 12 and 12' are embedded in opposite sides of the driveway leading to the garage and also in the floor of the garage, these antennæ being respectively adapted to receive signals transmitted from two motor vehicles. One vehicle only is shown in Fig. 1 and designated X, but for convenience in the following description the other will be referred to as vehicle Y.

*The transmitter*

Figure 2:
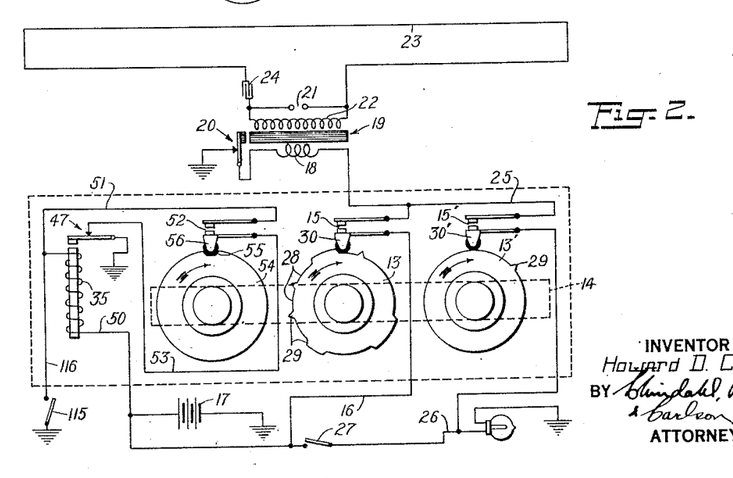
Fig. 2 is a schematic view of the radio transmitter.

The signal transmitter, which is by preference employed in carrying out my invention, forms per se the subject matter of my copending application Serial No. 175,377 filed March 14, 1927. Referring first to Fig. 2, it comprises two disks 13 and 13' fixed upon a rotatable shaft 14 and operating to close two sets of contacts or switches 15 and 15' to effect the transmission of radiant energy impulses in predetermined combinations. The switch 15 is interposed in a circuit 16 including a battery 17, preferably the storage battery of the motor vehicle, and the primary 18 of an induction coil 19, the latter having the usual vibrator 20. A spark gap 21 is interposed in parallel with the secondary 22 of the coil 19, this latter circuit being in series with a closed or loop antenna 23 and a condenser 24 forming an oscillatory circuit. The loop 23 is preferably concealed from view beneath the body of the motor vehicle, and being mounted in such position is in close proximity to the receiving antenna as the vehicle approaches and enters the garage and vice versa. The switch 15' is interposed in a circuit 25 in shunt with the circuit 16 and including a part of the motor vehicle light circuit 26 such, for example, as the tail-light circuit 26 such, the latter having therein the usual hand operated switch 27.

The disks 13 and 13' constitute rotary sending elements, and are constructed to provide peripheral depressions 28 and elevations 29 constituting control elements which are adapted to determine the character and spacing of the units of the codal signal during each signalling cycle or revolution of the shaft 14. The movable contacts of the switches 15 and 15' are equipped with followers 30 and 30' adapted to engage with the peripheries of the disks 13 and 13' respectively so as to close the switch contacts when an elevation is encountered. It will be apparent that in each revolution of the disks 13 and 13', the switches 15 and 15' are operated, the former operating intermittently at predetermined intervals and the latter once in each cycle but at a predetermined point therein. In such operation of the switches, the elevations serve to close the switch or switches as the case may be and hence cause fields of radiant energy to be sent out from the antenna 23 in the preconcerted combination. The closing of the switch 15' is effective to energize the induction coil 19 only when the hand operated switch 27 controlling the light circuit 26 is closed.

Figure 5:
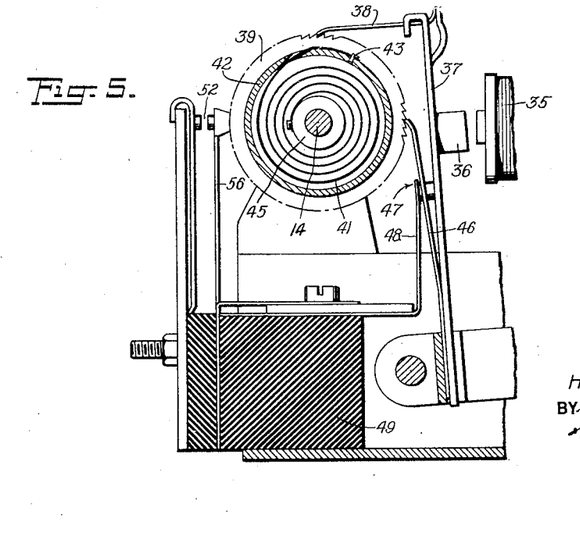
Fig. 5 is a vertical sectional view along line 5—5 illustrating the driving means for the transmitter.

Power to drive the shaft 14 carrying the disks 13 and 13' is derived from a motor consisting of a magnet having one or more coils 35 (Fig. 3) and an armature 36. Said armature is carried upon a spring arm 37 (Fig. 5) anchored at its lower end and carrying at its upper end a pawl 38. The arm 37 normally occupies the position shown in Fig. 5 with the armature spaced from the core of the magnet so that when the latter is energized, the arm is placed under tension. Consequently, when the coils are deenergized, the force resulting from the tension in the spring arm operates the pawl to drive a ratchet wheel 39, the latter being mounted loosely on the shaft 14.

Between the actuating motor and the shaft 14 carrying the disks 13 and 13', is an energy storage means adapted to permit of variations in the speed of the motor relative to the shaft 14, the latter being governed for operation at a predetermined speed by means to be later described. This storage means herein comprises a coiled torsion spring 41, enclosed within a drum 42 (Fig. 5), one end of the spring being anchored at 43 to the drum which is fast on the shaft 14. The other end of the spring 41 is fixed to a collar 45 rigid with the ratchet wheel and projecting into the drum. A spring pawl 46 serves to hold the ratchet wheel against reverse rotation.

Associated with the armature 36 of the electromagnet is a suitable interrupter 47 (Figs. 2 and 5) consisting of a pair of contacts one rigid with the arm 37 and the other carried on the upper end of a yieldable arm 48 anchored at its lower end upon an insulating block 49. The interrupter circuit (see Fig. 2) extends from the ground through the storage battery 17, a conductor 50, the magnet 35, a conductor 51, a switch 52, a conductor 53, the interrupter switch 47 and back to the ground. The contacts constituting the swich 52 are adaped to be controlled by a disk 54 fast on the shaft 14 (Fig. 2) and having a notch 55 with which a follower 56 coacts. Thus it will be apparent that after an initial operation of the shaft 14 causing the follower 56 to ride out of the notch 55 in the disk 54, the switch 52 is held closed for the remainder of the signalling cycle, that is, the revolution of the shaft 14. Thereupon through the operation of the interrupter 47, the armature 36 will be reciprocated, and since this armature carries with it the pawl 38, the ratchet wheel 39 will be driven in a direction to wind the coil spring 41.

Figure 4:
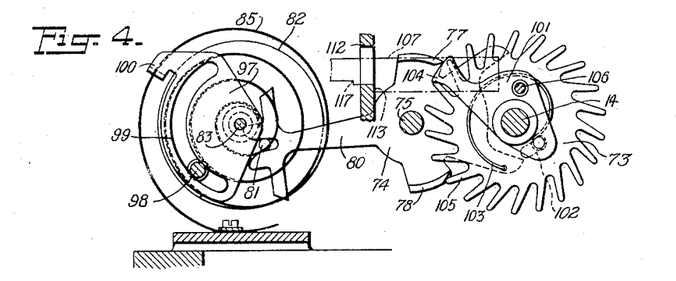
Fig. 4 is a fragmentary vertical sectional view taken approximately in the plane of line 4—4 of Fig. 3 and showing the escapement mechanism for controlling the speed of rotation of the sending element.

The means for governing the rotation of the shaft 14 so as to insure its operation at a predetermined speed is in the form of an escapement mechanism (Fig. 4). This mechanism may consist of a toothed escapement wheel 73 fast upon the shaft 14 and a pallet 74 mounted on a shaft 75. The pallet 74 has arcuate dogs 77 and 78 at its opposite ends adapted to engage alternately with teeth of the escapement wheel to effect a rapid step-by-step movement of the shaft 14 during each signalling cycle. An arm 80 extends rearwardly from the pallet and is forked at its end to receive a pin 81 on a balance wheel 82. Thus the balance wheel is free to oscillate in a well known manner under the control of a coiled balanced spring 85.

In order that the period of oscillation of the balance wheel 82 and therefore the speed of the shaft 14 may be increased or decreased as desired to correspond to the fixed speed of the selector mechanism to be described later, I employ a segmental member 97 (see Fig. 4) mounted on the shaft 83 and adjustably secured to a suitable stationary support 84 (Fig. 3) by a screw 98 extending through an elongated arcuate slot 99 in the member. The member has an arm 100 slotted to receive snugly the outer loop of the balance spring 85 so that the effective length of the spring will be determined by the position of said arm. By adjusting the member 97 angularly, the spring may be adjusted so as to properly time the movements of the pallet 80 by increasing or decreasing the period of oscillation of the pallet.

Figure 3:
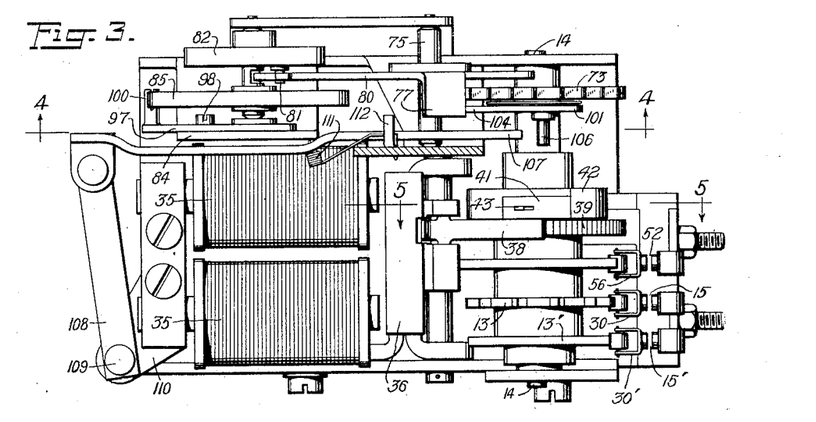
Fig. 3 is a plan view of the transmitter not including the electrical connections.

Means is provided for starting the shaft 14 for rotation through an operating cycle and for stopping the shaft after such rotation. This means comprises an arm 101 loose on the shaft 14 and having a pin-and-slot connection 102 (Fig. 4) with the escapement wheel 73, a spring 103 being arranged to swing the arm in the direction of rotation of the shaft 14 as permitted by the pin-and-slot connection. As shown in Fig. 4, this arm 101 has a stop finger 104 which is arranged to coact with the upper dog 77 of the pallet 74 so as to hold the upper end of the pallet out of engagement with the escapement wheel while maintaining the dog 78 at the lower end of the pallet in holding engagement with a tooth 105 of the escapement wheel. The arm 101 also carries a pin 106 which is adapted to be engaged by the free end of a trip bar 107 (Figs. 3 and 4). The other end of said bar is pivotally connected to an armature 108 at the end of the magnet 35 opposite the armature 36. Herein the armature 108 is pivoted on a vertical axis at 109 on a bracket 110. A spring 111 acts between the trip bar 107 and a stationary slotted plate 112 so as to exert a combined downward and rearward force on the trip bar. Rearward movement of the bar and hence of the armature 108 is normally limited by a shoulder 113 on the bar (see Fig. 4), which shoulder engages with the plate 112 at the lower edge of the slot therein. The operation of the trip bar 107 through the energization of the magnet coil 35 results in the movement of the cam finger 104 on the arm 101 by the engagement of the end of the bar with the pin 106, thus releasing the pallet 74 for oscillation.

The magnet coils 35 are arranged to be initially energized to trip the control mechanism for the shaft 14 by means of a hand switch or push button 115 (Fig. 2) interposed in a conductor 116 connecting the magnet 35 with the ground in a manner such as to permit completion of a circuit with the battery 17. When this switch 115 is closed the armature 108 is attracted and the trip bar 107 is moved in a direction to strike the pin 106 on the arm 101 thereby moving the stop finger so as to disengage it from the pallet dog 77, thus freeing the pallet for oscillation and setting in operation the shaft 14 by the action of the main spring 41 and under the control of the balance spring 85.

In the operation of the trip bar 107 to start the shaft 14 through an operating cycle, a second shoulder 117 (Fig. 4) on the trip bar moves under the action of the spring 111 into engagement with the plate 112, at the lower end of its slot. The armature 108 is thus held in engagement with the pole pieces of the magnet until the shaft 14 approaches the end of its cycle of operation when the pin 106 engages the trip bar and lifts the latter slightly so as to disengage the shoulder 117 from its engagement with the plate 112. The spring 111 then operates to withdraw the armature 108 to its initial position and this occurs after the interruption of the interrupter circuit by the opening of the switch 52.

In the rotation of the shaft 14 the disks 13 and 13' operate the two switches 15 and 15' to cause a codal signal to be transmitted. The disk 13 operates to send a predetermined combination of impulses and the disk 13' is or is not effective to vary the codal signal transmitted depending upon the condition of the switch 27 controlling the tail-light circuit 26. When the disk 13' is effective an additional signal impulse is transmitted for the purpose of controlling the operation of the garage lighting system as hereinafter more fully set forth.

The receiver and selector

Figures 9, 10, 11:
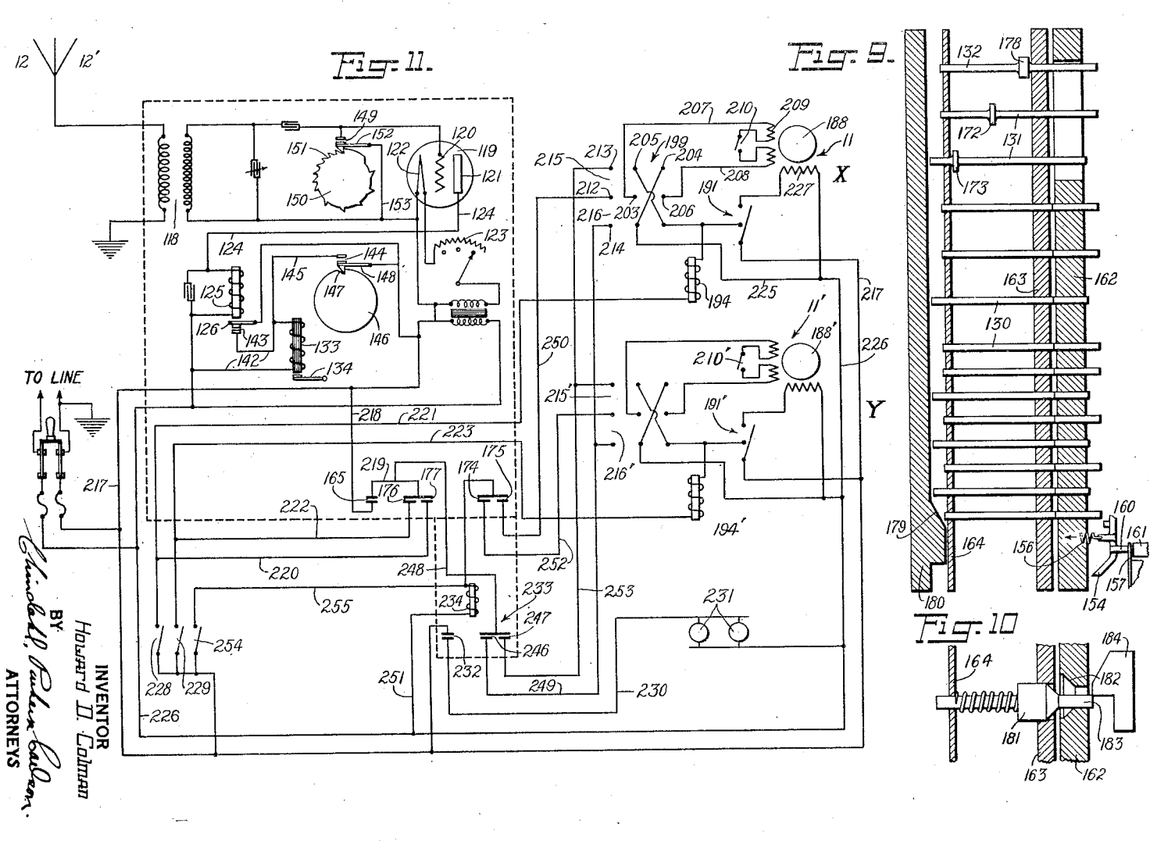
Fig. 9 is a development of the drum containing the selecting elements of the receiver, the drum being shown in section.
Fig. 10 is a fragmentary sectional view illustrating a detail of construction.
Fig. 11 is a theoretical wiring diagram of the receiver circuit in combination with the door selecting and light control circuits for the garage.

This apparatus in its preferred form forms per se the subject matter of my copending application Serial No. 120763, filed July 6, 1926. As therein fully described, the receiving apparatus comprises the antennæ 12 and 12' grounded as shown in Fig. 11 and coupled at 118 with a controlling circuit containing a vacuum detector tube 119. This tube is of the three element type comprising a grid 120, a plate 121 and a filament 122. In series with the filament is an adjustable resistance 123 and the filament is adapted to be heated continually from a 110 volt alternating current line through a transformer stepping down the voltage to approximately six volts. The alternating current applied at 110 volts to the plate or controlled circuit 124 is rectified by the detector tube and therefore is undirectional in character. Detection of the codal signals is effected by the grid condenser method no grid leak being employed for reasons which will appear hereinafter. The single tube constitutes a rectifier and in addition performs the detecting and usual amplifying functions so that the change in the output power upon the reception of a signal is sufficient to operate a suitable controlling relay.

Such a relay is shown in the present instance as comprising an electromagnet 125 interposed in the output circuit and having an armature 126 operating in response to the received signal to control the operation of the selector mechanism the latter in turn controlling the power driven door operator. The wave trains constituting the impulses of the codal signal transmitted from the motor vehicle and received by the antennæ 12 or 12' affect the grid in the well known manner, producing negative charges thereon which cause a decrease in the current in the plate circuit 124.

Figure 6:
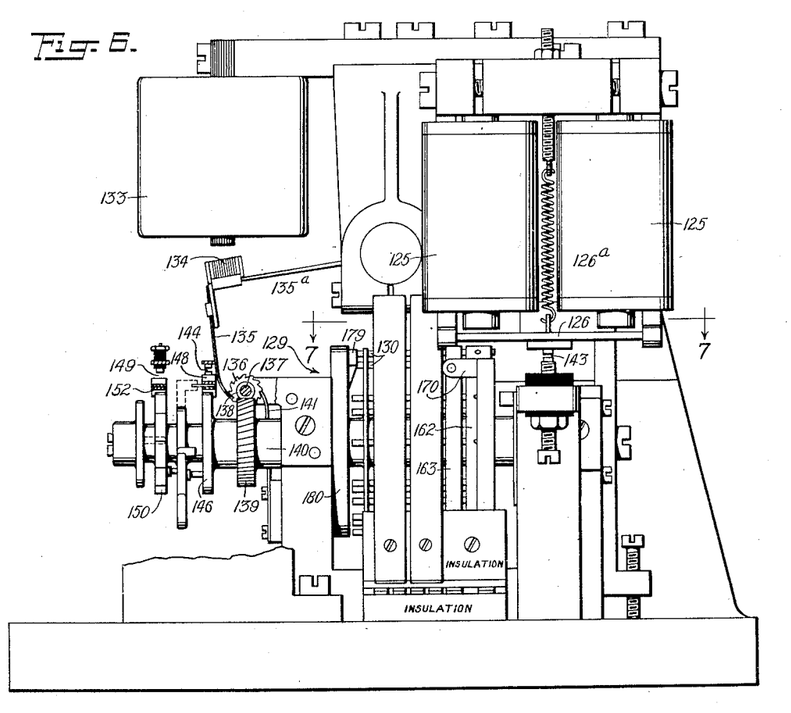
Fig. 6 is a fragmentary elevational view of the receiver mechanism.

The magnet 125 is normally energized according to the present arrangement, and thus holds the armature 126 raised against the action of a coiled spring 126ª (Fig. 6); and the decrease in current in the plate circuit effected by each received energy field substantially deenergizes the magnet. The armature is therefore released to the action of its spring 126ª upon the reception of each wave train or impulse of the signal. It is to be observed, however, that the arrangement employed is such that only relatively strong signals are capable of effecting the operation of the magnet armature. To insure such operation of the magnet armature, the sending and receiving antennæ are brought into relatively close proximity, i. e., within a range where the electromagnetic and electrostatic fields emanating from the transmitting antenna are relatively strong as compared to the radiation fields it being a known fact that the former fields decrease much more rapidly in strength than the radiation fields as the distance from the sending antenna increases. Thus the receiver is not responsive to wave trains emanating from other signalling apparatus at more or less remote points.

Figure 7:
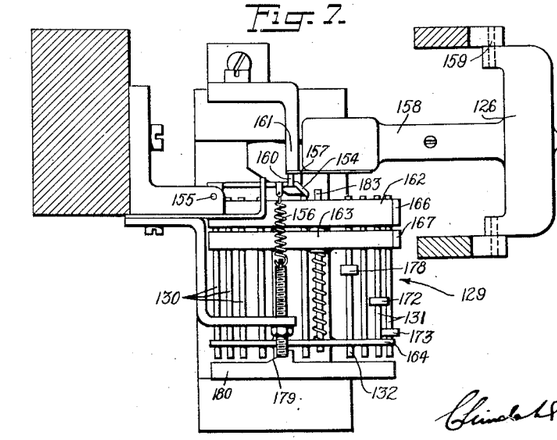
Fig. 7 is a horizontal plan section of the receiver mechanism taken approximately in the plane of line 7—7 of Fig. 6.

The movements of the armature 126 of the magnet 125 are adapted to control the operation of the selector mechanism which comprises a drum 129 (Figs. 6 and 7) carrying a plurality of selector elements such as pins 130, 131 and 132, and adapted to be driven under the control of the initial impulse of the received signal through a predetermined cycle in timed relation with the sending element of the transmitter. It will be apparent that inasmuch as a garage door is operated relatively infrequently, it is practically essential that the driving means for the drum be of a character such as to be capable of starting from a normal rest position, attaining a predetermined speed substantially instantaneously, and maintaining such speed through the predetermined operating cycle. I therefore employ a motor which is electrically driven and capable of meeting the foregoing requirements. This motor comprises an electromagnet 133 having an armature 134 arranged to be energized from a source of alternating current. The magnet, responding to the current reversals occurring twice per cycle, rapidly raises and lowers a pawl 135 supported upon a spring arm 135ª having a natural period of vibration substantially equal to the frequency of the alternating current. The pawl 135 depends from the armature 134, and is adapted to engage with a relatively small ratchet wheel 136 fast upon a shaft 137 and carrying a worm 138 meshing with a worm wheel 139 secured to a shaft 140 carrying the selector drum. A spring retaining pawl 141 coacts with the ratchet wheel to prevent reverse rotation thereof.

In the present instance the motor magnet 133 is interposed in a circuit 142 connected to opposite sides of the power lines (Fig. 11) and containing a switch 143 operable by the armature 126 of the control magnet 125 in the output circuit of the tube, the arrangement being such that the initial impulse of the received signal effects a closing of the switch 143 to start the motor in operation. A second switch 144 interposed in a parallel circuit 145 is adapted to be controlled by a disk 146 rotating with the controller drum and having a notch 147 therein with which a follower 148 coacts to operate the switch 144. By this arrangement after the motor has been started under the control of the armature 126 through the medium of the switch 143, the supply of current to the motor is continued through a predetermined cycle of operation (one revolution) by the disk 146 through the medium of the switch 144. Thus the motor is started from a normal rest position upon the receipt of the initial impulse of the signal and after operating through the predetermined cycle is automatically stopped by opening the switch 144, the switch 143 being at this time also open.

In the rotation of the selector drum through its operating cycle, the armature 126 of the control magnet operates in response to the received energy fields or impulses to effect the desired selection by the operation of the pins 130, 131 and 132 carried by the drum. To insure that the detector tube shall be conditioned for the reception of each of the received impulses and thus operate properly to control the magnet 125 in the presentation of the selector elements of the drum, I provide, in the present instance, a device operating mechanically to close a switch 149 (Fig. 11) periodically so as to ground and thereby discharge the grid 120 of the tube once for each of the signal units. This mechanically operating means comprises in the present instance a disk 150 fast on the drum shaft 140 and having a plurality of teeth 151 with which a follower 152 coacts to close the grounding or grid discharge switch 149. The position of the teeth 151 on the disk is such that at a predetermined time following the reception of each impulse of the controlling signal, the input or grid circuit is connected to ground by a conductor 153 leading to the side of the filament circuit which is connected to the grounded power line. Accordingly, the receipt of a signal impulse resulting in a decrease in the current in the output circuit causes the control magnet 125 to release its armature, and the subsequent discharge of the gride effects a reenergization of the control magnet restoring the control armature to its initial position for the next unit of the signal.

The means whereby the movements of the control armature 126 are utilized to effect the desired selection of elements in the rotating control drum, comprises (Figs. 7 and 9) a device in the nature of a plow 154 pivoted at 155 and having a cam-like portion arranged to engage with the selector elements successively in the rotation of the drum. A light spring 156 tends to draw the plow in the direction of the selector elements, but the tension on this spring is such as to permit the plow to yield when engaged by a selector element without affecting the position of the latter unless the plow is otherwise prevented from moving. Means is employed, however, to block the movement of the plow in the case of the selector elements which are to be operated. This means comprises a blocking finger 157 in the form of a flange upstanding from an arm 158 rigid with the armature 126, the latter being pivoted at 159 at a point between the end portion associated with the magnet and said arm. This blocking finger is movable in a vertical plane into and out of position between a lug 160 on the plow and a fixed stop member 161, the lug being disposed so as to be capable of clearing the stop member when unrestrained by the blocking finger. According to the present arrangement, the blocking finger is normally positioned (when the control magnet is energized) in interlocking relation with the stop member 161 and the lug 160 on the plow. Thus the blocking finger operates when the armature is attracted by the magnet, i. e. during each space unit of the codal signal, to block the plow so as to push a selector element; and when the armature of the magnet is released upon the reception of a signal impulse, the blocking finger is raised out of blocking position, permitting the plow to yield against the action of the spring 156, in which event a selector element is not operated. The units of the signal are thus in effect distributed to the corresponding selector elements in the controller drum.

Figure 8:
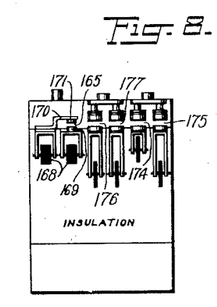
Fig. 8 is a detail view of the switches controlled by the receiver.

The selector drum comprises in the present embodiment two disks 162 and 163 and a third disk 164. The selector elements 130 are in the form of pins made in two sections, one section of each pin being carried by the two disks 163 and 164 which are rigid with the drum shaft 140, while the other section of each pin is carried by the disk 162 capable of a slight turning movement on the shaft relative to the disks 163 and 164. The dividing lines between the pins 130 are, as will be apparent from Fig. 9, so arranged that at the beginning of any cycle of operation the disks are locked together, but when moved in response to the proper signal combination will permit relative movement between the disks. Such relative movement is utilized to control the operation of the door operator by closing a switch 165 (Fig. 8).

For the purpose of operating the switch 165 the disks 162 and 163 are provided with cam segments 166 and 167 thereon which act on a pair of followers 168. One of said followers carries a contact 169 (Fig. 8) and the other has rigid therewith a laterally extending arm 170 carrying a contact 171. The followers are actuated simultaneously when the two sections of the drum are locked together in their normal relation, so that the two contacts move together and the switch formed thereby remains open; but when the selector elements have been set in the proper combination to release the drum sections for relative movement, that section which is loose on the shaft will upon engaging with its follower lag slightly so as to enable the cam on the other segment to close the switch 165. Consequently the door controlling circuit hereinafter described will be closed only when the proper signal combination is received.

The two pins 131 following the series of pins 130 are presented to the pusher after the pins 130. These two pins are not made in sections but are provided with cams 172 and 173 either of which, if left in its normal position by the reception of a signal impulse at the time when it is opposite the pusher, will close corresponding switches 174 or 175 (Fig. 8). These switches are used in the control of the garage lights and each is intended to be closed in response to a signal sent by the transmitter only when the lighting circuit of the corresponding car is closed at the time the signal is transmitted. Thus if such a light control impulse is sent the signal transmitted is changed to form a different signal combustion and the pin 131 corresponding to the sending vehicle will be operated. In this way either the switch 174 or the switch 175 will be closed when the corresponding motor vehicle sends its signal, providing the lighting circuit on that car is closed at the time. It will therefore be apparent that whereas a given door will always be operated under the control of the signal sent from the corresponding vehicle, only when the lighting circuit of the vehicle is closed so as to cause a different signal combination to be sent, is the switch controlling the lighting circuit operated.

The auxiliary pin 132 is adapted to close one of two door selecting switches 176 and 177 upon each revolution of the selector drum. To this end, it carries a cam 178 which if shifted from normal position by the pusher 154 under the control of a space unit in the signal from one of the cars, will close the switch 177, while the switch 176 will be closed if the pin 132 is not shifted as would be the case if the transmitted signal contains an impulse corresponding to the position of the pin 132.

It will, of course, be understood that means is provided for resetting the pins 130, 131 and 132 in advance of their presentation to the pin pushing device. Herein this means comprises a cam surface 179 formed on a stationary member 180 (Fig. 9) and coacting with the ends of the pins opposite the plow. Also means is provided to reset the loose disk 162 before the end of each operating cycle. As herein shown (Fig. 10) this means comprises a spring pressed conical plunger 181 in the disk 163 coacting with a socket 182 in the disk 162. Near the end of the operating cycle, a pin 183 carrying the plunger engages a cam 184 to unseat the plunger and release the disks for relative movement, the spring acting after the pin passes the cam, to reset the disks.

It will be observed from Fig. 9 that the selector elements of the controller drum are spaced a greater distance apart near the end of the series than at the beginning of the series, and a similar arrangement of the control elements on the sending disk 13 is employed. Also the teeth 151 on the grid discharge disk 150 are spaced a greater distance apart near the end of the series than at the beginning. The result of such an arrangement is that in the operation of a given selector element the controlling unit of the signal for that element will be effective for control purposes if received at any point in the control period which commences with the discharge of the grid and ends with the engagement of the next element with the plow. Therefore, by arranging the parts so that the signal units are normally received at the central point in such control period slight variations in the speeds of the sending and receiving mechanisms are permissible; and by the variable spacing arrangement described, the control period for the selector elements near the end of the series may be made longer to compensate for cumulative variations in speed between the two mechanisms, in either direction.

It will be seen that the selecting apparatus thus described is adapted to control the selection of a combination switch 165, door-selecting switches 176 and 177, and light-controlling switches 174 and 175, in response to codal signals sent from the two motor vehicles X and Y. The arrangement may be such that when the car X signals with its lighting circuit open, switches 165 and 177 will be closed simultaneously, but if the lighting circuit is closed when the signal is transmitted, switch 175 will also be closed. Likewise car Y will cause switches 165 and 176 to be closed simultaneously when signalling with its lighting circuit open, while switches 165, 176 and 174 will be closed when the car Y signals with its lighting circuit closed.

*The door operator*

The power driven door operators 11 and 11' (Fig. 12) may be of the type disclosed and claimed in my copending applications Serial No. 166,086 filed February 5, 1927, and Serial No. 283,802, filed June 8, 1928. One operator may be provided for operating each pair of doors when the proper signal combination is received. Briefly stated, the operator therein disclosed comprises a traveling car 185 connected by rods 186 to each door of a set to be operated, and a motor driven power unit 187 for moving the car along a trackway in one direction to open the doors and in the opposite direction to close the doors.

The driving unit (Fig. 12) for each operator includes a single phase induction motor 188 (Fig. 11) connected through appropriate speed reduction gearing (not shown) to a rack bar 189 which is secured to the car 185. A floating lever 190 is employed for controlling the main motor switch 191 and operating a brake 192 to initiate and terminate each opening and closing cycle of operation of the driving unit.

Figure 12:
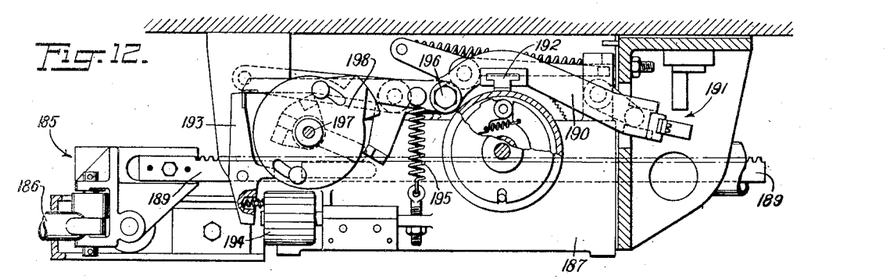
Fig. 12 is a fragmentary elevation section illustrating certain features in the construction of the door operator.

Normally the lever 190 is held in releasable position as shown in Fig. 12 by a latch 193 constituting the armature of a magnet 194. When the magnet is energized to trip the lever, a spring 195 swings the lever about a pivot stud 196 which is then stationary, thereby closing the motor switch and releasing the brake to initiate a cycle of operation of the motor. Near the end of the cycle, a cam shaft 197 is oscillated in one direction or the other through a lost motion connection with the rack bar 189, and a cam device 198 thereon swings the lever 190 about its rear end as a fulcrum to reset the latch 193 for the next cycle of operation and thereafter releases the lever. When thus released by the cam device the lever pivots about the end of the latch 193 as a fulcrum and in this movement opens the motor switch 191 and applies the brake. The door operating cycle is thereby automatically terminated, and the brake operates through its connections with the doors to hold the latter in closed position.

The direction of rotation of the motor either to open or to close the doors is determined by a reversing switch 199 herein shown as comprising two insulated connecting plates 200 and 201 (Fig. 13) mounted in an insulating block 202 on the cam shaft 197 and adapted to connect stationary contacts 203 and 204 with contacts 205 and 206 respectively, when the cam shaft is oscillated into door-closed position as shown in Fig. 12 and to connect contacts 203 and 205 with contacts 204 and 206 respectively, when the cam shaft is in its door-open position. As shown in Fig. 11, the contacts 203 and 206 are connected respectively by conductors 207 and 208 to the starting field 209 of the motor in which is interposed the usual switch 210 which is closed when the motor is stopped and held open by centrifugal action when the motor is running. Thus, it will be seen that upon such energization of the magnet of either door operator the operation of that operator will be initiated and automatically terminated and that the reversing switch will be actuated so that the motor for the operator will be started in opposite directions upon successive energizations of the control magnet.

The block 202 also carries a plate 211 which connects one of two contacts 212 with a contact 213 when the cam shaft is in a position (Fig. 12) corresponding to the closed position of the doors, and the other contact 212 with a contact 214 when the cam shaft is in the other position. Thus, one contact 212 cooperates with the contact 213 to form a switch 215 (see Fig. 11) which is closed when the doors 10 operated by the operator 11 are in closed position, and open when said doors are open. The other contact 212 together with the contact 214 forms a switch 216 which is closed when said doors are open and open when the doors are closed. Similar contacts are provided on the operator 11′ for the doors 10′ and constitute switches 215′ and 216′.

Door operation

Closure of the switches 165 and 177 simultaneously under the control of the signal sent from the car X may be utilized to energize the latch magnet 194 of the door operator 11 for opening or closing the doors 10 of the doorway assigned to the car X while energization of a latch magnet 194′ to open or close the doors 10′ may be effected by closure of the switches 165 and 176 simultaneously. To these ends, the combination switch 165 is connected as shown in Fig. 11 to the power line 217 by a conductor 218 and to each of the door selector switches 176 and 177 by a conductor 219. Each of the switches 176 and 177 is adapted to control the energization of the latch magnet for the corresponding door operator. In the case of the operator 11 for the car X, the energizing circuit for the latch magnet 194 leads from the switch 177 through conductors 220 and 221 while conductors 222 and 223 extend from the switch 176 to the latch magnet 194′ for the door operator corresponding to the car Y.

The energizing circuit for the latch magnet 194 of the power operator 11 may be traced as follows, assuming that switches 165 and 177 are closed simultaneously by the reception of the proper signal combination transmitted from the car X: from the power line 217 through conductor 218, switch 165, conductor 219, switch 177 conductors 220 and 221, latch magnet 194, closed contacts 205 and 203 of the reversing switch, conductor 207, starting field 209 of the motor, switch 210 which is then closed, the motor being stopped, conductor 208, reversing switch contacts 206 and 204, and a conductor 225 to the power line 226. Energization of the magnet 194 releases the floating control lever 190 of the door operator 11 which connects the main motor field 227 to the power lines 217 and 226 and also establishes a circuit for the starting field 209 as follows: from the power line 217, through the main switch 191, contacts 205 and 203, conductor 207, field 209, switch 210, conductor 208, contacts 206 and 204, conductor 225 to the power line 226. When the motor has attained a predetermined speed, the switch 210 will be opened thereby cutting out the starting field 209. At the end of the door operating cycle, the switch 191 will be opened automatically as above described to stop the motor and the reversing switch 199 will be actuated to connect contacts 203 and 204 and contacts 205 and 206. This will condition the motor for reverse rotation when the latch magnet 194 is again energized. Similar operating circuits may be traced to show that the latch magnet 194' for the operator 11' corresponding to car Y will be energized whenever switches 165 and 176 are closed simultaneously and the motor of this operator is stopped so that switch 210' will be closed.

To permit operation of the door operator 11 independently of the radio receiving mechanism, a switch 228 may be provided inside of the building for connecting the conductor 221 to the power line 217.

A similar switch 229 connecting the power line 217 and the conductor 222 may be provided to permit operation of the power operator 11' for the other set of doors.

Attention is directed to the fact that by connecting the combination switch 165 and the door selecting switches 176 and 177 in series within the energizing circuits for the latch magnets for the power operators, operation of the doors can take place only when the proper signal combination is received. If the combination switch were not included, one of the door operators would be started upon each revolution of the selector drum which, it will be remembered, is adapted to be started upon the reception of an impulse of radiant energy sufficient to move the selector armature 126.

It will also be noted that the combination switch 165 might be omitted by constructing the radio receiving mechanism to close switch 176 upon the reception of one signal combination and to close switch 177 upon the reception of a different combination.

*Light control*

In the present instance, the garage is equipped with a single electric lighting circuit 230 and means is provided for controlling the opening and closing of this circuit in response to light control signals transmitted from either of the cars X and Y, the reception of such signals being indicated as above described by the simultaneous closure of the combination switch 165 and either of the light control switches 174 and 175. The garage lights 231 are interposed in the lighting circuit 230 between the power lines 217 and 226, said circuit including a switch 232 which is arranged to be operated by the control means above mentioned.

Figures 13, 14, 15:
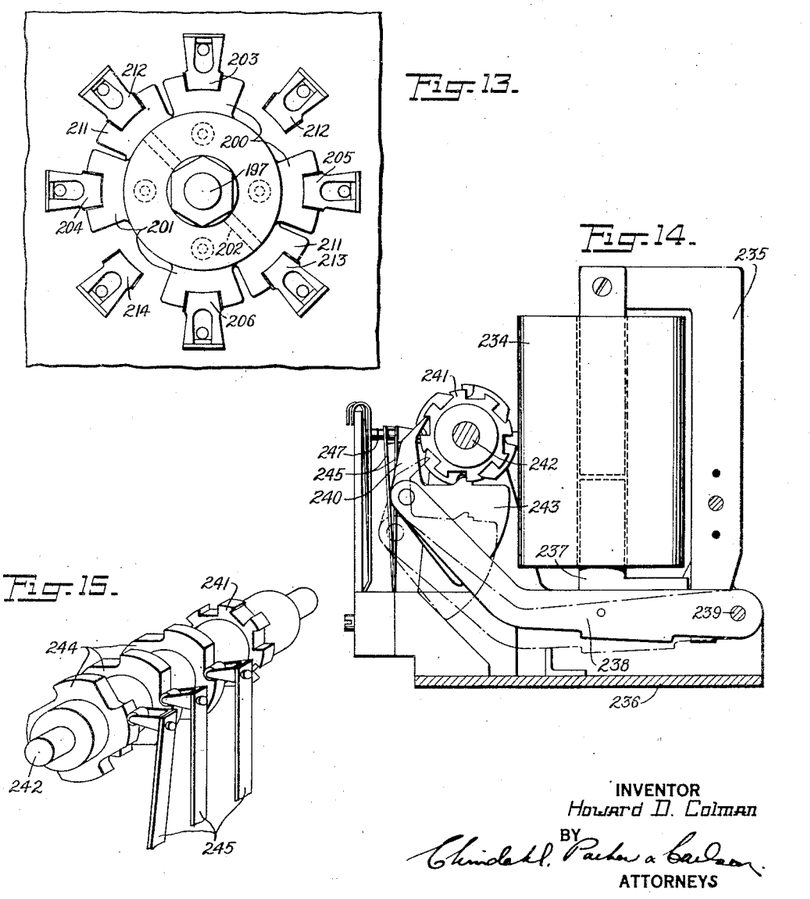
Fig. 13 is an elevational view of a switch used in the control of the door operator motor and the lighting circuit of the garage.
Fig. 14 is a side elevational view of a ratchet switch device employed in the control of the lighting circuit of the garage.
Fig. 15 is a perspective view of a portion of said switch device.

This light control means includes an electromagnetic switch 233 which is shown as a unit in Figs. 14 and 15 and which comprises an electromagnetic coil 234 suspended from a U-shaped core 235 supported between the upturned side-pieces of a frame plate 236. The coil has an L-shaped armature 237 pivotally supported between arms 238, which are pivoted on the main frame at 239. Pivoted between the upwardly extending ends of the arms 238 is a pawl 240 which is adapted to advance a ratchet wheel 241 fixed on a rotatable shaft 242 whenever current is applied to the magnet 234.

Normally the armature and the lever arms 238 are positioned as shown in dotted outline in Fig. 14, a weighted portion 243 then serving to hold the pawl in engagement with one of the ratchet teeth. When the coil is energized, the armature is attracted to the core of the magnet thereby raising the pawl into the position shown by full lines in Fig. 14, thereby advancing the wheel 241 one step. When the magnet circuit is broken, the armature and the lever arms 238 fall back into position for the next operation.

Mounted on the shaft 242 are three cam members 244, each having teeth which work against spring follower arms 245 to close or permit the opening of three switches 232, 246 and 247 (Fig. 11), each having one contact carried by the followers 245. The switch 232 as above described is the control switch for the garage lights. The cam members 244 are arranged on the shaft 242 so that the switches 232 and 246 will be closed and the switch 247 will be opened upon alternate advancing steps of the shaft 242 while on the remaining steps the switch 232 and 246 will be opened and the switch 247 will be closed. In the former case, garage lights will be turned on and in the latter case, the lights will be turned off.

The switching mechanism by which the energization of the magnet 234 is controlled to effect the operation of the garage lights forms the subject matter of an application by Duncan J. Stewart, Serial No. 177,555, filed March 23, 1927, and comprises generally four independent circuits interposed in parallel between the combination switch 165 which is connected to the power line 217 and the magnet coil 234 which is connected to the power line 226. Each of these circuits contains three switches which are arranged to be operated in various combinations to meet the requirements outlined more in detail in said last mentioned application.

As is shown in Fig. 11, one of these energizing circuits for the magnet 234 extends from the combination switch 165 through a conductor 248, the switch 246, a conductor 249, switch 216 on the power operator 11, and a conductor 250, the light control switch 175, to the magnet 234 which is connected to the power line 226 by a conductor 251. A second circuit extends from the combination switch through the conductor 248, switch 246, switch 216' on the door operator 11', a conductor 252, the light control switch 174, to the magnet 234. A third circuit extends through the conductor 248, the switch 247, a conductor 253, the switch 215 on the power operator 11, the conductor 250, the light control switch 175 to the magnet 234. The fourth circuit extends through the switch 247, the conductor 253, switch 215' on the power operator 11', the conductor 252, the switch 174 to the magnet.

It will be seen that when the combination switch 165 and the three control switches in any of the four circuits just described are closed simultaneously, the magnet 234 will be energized and the ratchet wheel 241 will be advanced one step to turn the garage lights either on or off.

To permit operation of the garage lights at the will of the operator, a push button switch 254 may be mounted inside of the garage building and interposed in a conductor 255. By closing this switch, the magnet may be energized to turn the garage lights on or off as the case may be.

It will be observed that I have produced a system of remote control by radiant energy which while susceptible in some of its aspects to varied application, is especially adapted to the selective control of an operating instrumentality, such as a door operator for garages or other buildings, from a motor vehicle whether moving or stationary. Thus the transmitter is particularly adapted for use on a motor vehicle in that the power for operating the transmitter is derived from the storage battery of the vehicle, and being transmitted through a spring is subject to control by an escapement mechanism so as to operate at a predetermined substantially constant speed through a given operating cycle. The escapement mechanism, moreover, is capable of adjustment to regulate the speed in accordance with the speed of the selector mechanism associated with the receiver, the latter speed being determined through the use of a synchronous vibratory motor by the frequency of the alternating current used as the source of energy for the motor, such frequency being maintained substantially constant in a given area. The transmitter and selector as thus controlled during their operating cycles are especially adapted for radiant energy control systems wherein a common synchronizing means is not practicable due to the absence of connecting lines.

Moreover, the driving motors of both the transmitter and selector are adapted to be operated from a normal rest position the transmitter under manual control and the selector under the control of the initial impulse of the signal, such operation from a normal rest position being practically necessary where the controlled operating instrumentality is subject to infrequent use. Thus the transmitter and the receiver with its selecting mechanism are in the nature of start-stop mechanisms but different from the start-stop transmitters and receivers ordinarily used in telegraphic signalling in that the driving motors themselves are started and stopped in each signal cycle. This starting and stopping of the motors is rendered possible because of their vibratory character, it being found in practice that upon the closing of their control circuits normal speed and torque are attained substantially instantaneously, and upon the breaking of the control circuits the motors stop instantaneously.

Furthermore, the use of a receiver responsive only to radiant energy impulses which are relatively strong, as when the transmitting antenna on the motor vehicle or vehicles is in relatively close proximity to the receiving antennæ, is of great practical importance. This is for the reason that the receiver control magnet responds only to signals intended therefor, and also, by rendering unnecessary the use of a sensitive apparatus, reduces the cost of manufacture and maintenance.

In the appended claims the term "close proximity" is employed in the sense hereinabove referred to, viz, within a range where the electromagnetic and electrostatic fields are strong as compared to the radiation fields, it being known that the former decrease in strength as they emanate from the sending antenna much more rapidly than the latter.

Also it should be understood that while I have herein illustrated and described a vacuum tube as the means responsive to the transmitted radiant energy fields I do not intend to be limited to such a device, it being obvious that any other thermionic device may be employed.

The transmitting antenna which is carried by the motor vehicle is claimed per se in the copending application of D. J. Stewart Serial No. 196,710, filed June 6, 1927; and the receiving antenna per se is claimed in the copending application of D. J. Stewart Serial No. 425,363, filed Feb. 3, 1930.

I claim as my invention:

1. A radiant energy control system comprising, in combination with a closure and means adapted in alternate operations to open and close said closure, a radio transmitter operable from a normal rest position through a predetermined cycle to transmit a predetermined signal combination, and a receiver responsive to the transmitted signal and having a selecting means, driving means adapted to be started under the control of the transmitted signal and to operate in timed relation with the transmitter during its operating cycle, said selecting means comprising a series of selector elements arranged to be operated during said cycle so as to be set in a combination corresponding to the transmitted signal combination, and means operating upon such setting of the selector elements to initiate a cycle of operation of the closure operating means.

2. A radiant energy control system comprising a transmitter having driving means adapted to drive it from a normal rest position through a given operating cycle at a predetermined speed whereby to transmit a preconcerted signal combination, a receiver having a selecting mechanism, an electromagnet adapted to be connected with a source of alternating current of substantially constant frequency, an armature supported so as to have a natural period of vibration corresponding to the frequency of the alternating current, means operable in the vibration of said armature to drive the selecting mechanism in timed relation to the transmitter, and means operable under the control of the initial impulse of the received signal to close a circuit through said electromagnet and maintain it closed for a predetermined operating cycle.

3. A radiant energy signalling system comprising, in combination with a motor vehicle and a mechanism to be operated therefrom, a radio transmitter carried by the motor vehicle and includinig a sending device, driving means for the sending device including an electric motor and a spring adapted to be tensioned by the motor and arranged to drive the sending device, a receiver having a selecting means adapted to control the operation of said mechanism, and driving means for the selecting means including a synchronous electric motor connected with a source of alternating current and adapted to operate from a normal rest position to drive the selecting means through a predetermined operating cycle at substantially constant speed, the receiver motor being adapted to be started under the control of the initial impulse of each transmitted signal, and the transmitter further having means adapted to maintain substantially constant the speed of the sending device and at a rate corresponding to the speed of the selecting means.

4. The combination with a power driven door operator having means adapted to hold the door in closed position, of means for transmitting a preconcerted signal combination of radiant energy impulses, a selector mechanism including a plurality of selector elements adapted to be set in different combinations, means responsive to said signal combination to set said elements in a corresponding combination, and means operable by the selector mechanism when operated in accordance with said signal to initiate the operation of said door operator to open the door.

5. A radiant energy signalling system comprising, in combination with a power driven garage door operator and a motor vehicle, means carried by the vehicle for transmitting a preconcerted combination of radiant energy impulses including a sending antenna mounted beneath the vehicle, a receiving antenna arranged adjacent the driveway leading to the door to be operated, a selector mechanism, means responsive to the transmitted signal only when the vehicle is on the driveway with the sending and receiving antenna brought into relatively close proximity, whereby to operate said selector mechanism, and means operable by the selector mechanism when operated in accordance with said preconcerted signal to initiate the operation of said door operator.

6. A radiant energy control system comprising, in combination with a door operator or the like, a radio transmitter carried by a motor vehicle and including a sending antenna, a radio receiver including a receiving antenna and responsive only to relatively strong signal impulses received from the transmitter when the sending and receiving antennæ are in relatively close proximity, said receiver being operable at the end of a predetermined operating cycle to initiate the operation of the door operating mechanism.

7. A radiant energy control system comprising, in combination with a motor vehicle and a garage therefor having a door operating mechanism, a radio transmitter including a sending device carried by the motor vehicle, a radio receiver including a selecting mechanism adapted to control said door operating mechanism, said transmitter and receiver having driving means operating from normal rest positions through predetermined cycles in timed relation, the transmitter being adapted to send a preconcerted signal combination during its operating cycle for reception by the receiver to control said selecting mechanism, the sending device of the transmitter including a sending antenna also carried by the vehicle, and the receiver including a receiving antenna and electromagnetic control means for the selecting mechanism responsive only to relatively strong signals received from the transmitter when the sending antenna is in relatively close proximity to the receiving antenna.

8. A radiant energy control system comprising, in combination with a motor vehicle and a garage therefor having means adapted to operate a pair of doors selectively, a transmitter carried by the motor vehicle, and a receiver having selecting means for governing the door operating means, said receiver being adapted to initiate the operation of one or the other of said doors according to the character of the received signal.

9. A radiant energy control system comprising, in combination with a motor vehicle and a garage therefor having door-operating means and a lighting circuit, a transmitter carried by the motor vehicle, and a receiver having a selecting means, the transmitter being operable to send a preconcerted signal combination and the receiver being operable to control said selecting means in response to said signal, the selecting means being operable upon the reception of the preconcerted signal to initiate the operation of the door operating means and to control the operation of the garage lighting circuit according to the character of said signal.

10. A radiant energy control system comprising the combination with a motor vehicle having a lighting circuit and a garage therefor having door operating means and a lighting circuit, a transmitter carried by the motor vehicle, and a receiver having a selecting means, the transmitter being operable to send a preconcerted signal combination and the receiver being operable to control said selecting means in response to said signal, the selecting means being operable upon the reception of the preconcerted signal to initiate the operation of the door operating means, means controlled by the lighting circuit of the vehicle to vary said transmitted signal according to whether the lighting circuit on the motor vehicle is open or closed, and means controlled by the receiver and operating in response to the signal as thus varied to control the operation of the garage lighting circuit.

11. A radiant energy control system comprising, in combination with a motor vehicle and a power driven door operator, a transmitter carried by the vehicle and adapted to transmit a preconcerted signal composed of radiant energy fields and space units, a receiver including a detector tube constantly conditioned for the reception of signals, and a selector mechanism controlled by the receiver and operable upon the reception of said preconcerted signal combination to initiate the operation of said door operator.

12. A radiant energy control system comprising, in combination with a motor vehicle and a power driven door operator, a transmitter carried by the vehicle and adapted to transmit a preconcerted signal composed of radiant energy fields, a receiver including a detector tube having its heating element and its output circuit constantly connected with a source of electric current electromagnetic means in the output circuit, and a selector mechanism adapted to be controlled by said electromagnetic means and operable upon the reception of the preconcerted signal combination to initiate the operation of said door operator.

13. A radiant energy control system comprising, in combination with a motor vehicle and a garage having a power driven door operator, a transmitter carried by the vehicle and adapted to transmit a preconcerted signal composed of radiant energy fields, a receiver including a detector tube with an output circuit having electromagnetic means therein, and a selector mechanism having driving means adapted to be started upon the reception of the initial impulse of a transmitted signal and to stop automatically at the end of each signal, said mechanism being adapted to be controlled by said electromagnetic means and operable upon the reception of the preconcerted signal to initiate the operation of said door operator.

14. A radiant energy control system comprising, in combination with a motor vehicle and a garage having a power driven door operator, a transmitter carried by the vehicle and adapted to transmit a preconcerted signal composed of radiant energy fields, a receiver including a detector tube with an output circuit having electromagnetic means therein, and a selector mechanism having driving means adapted to be started upon the reception of the initial impulse of a transmitted signal, said mechanism being adapted to be controlled by said electromagnetic means and operable upon the reception of the preconcerted signal to initiate the operation of said door operator, said detector tube being in condition for the reception of signals transmitted from the vehicle while approaching the garage.

15. A radiant energy control system comprising, in combination with a garage having a source of electric power and a power driven door operator, and a motor vehicle to be housed in the garage, of a receiving apparatus for radiant energy signals including a detector tube connected with said power source of the garage so as to be normally conditioned for the reception of signals, a transmitter carried by the vehicle and operable to send a signal in the form of a preconcerted combination of radiant energy fields for reception by the receiver, and a selecting mechanism having driving means adapted to be started upon the reception of the initial impulse of a received signal and operable upon the reception of a preconcerted combination of impulses to control the operation of said door operator.

16. A radiant energy signalling system comprising, in combination with a motor vehicle and a closure mechanism to be operated therefrom, a radio transmitter carried by the motor vehicle and including a sending device, driving means for the sending device, a receiver having a selecting means adapted to control the operation of said mechanism, and driving means for the selecting means including a synchronous electric motor connected with a source of alternating current and adapted to operate from a normal rest position to drive the selecting means through a predetermined operating cycle at substantially constant speed, the receiver motor being adapted to be started under the control of the initial impulse of each transmitted signal, and the transmitter further having means for maintaining the speed of the sending device in accordance with the speed of the selecting means.

17. A radiant energy control system for a device to be operated comprising, in combination, means for transmitting a signal combination composed of radiant energy units and space units, a receiver including a single thermionic device constituting a detector and having an output circuit with electromagnetic means therein, a selector mechanism comprising a plurality of selector elements arranged to be set under the control of said electromagnetic means in response to the preconcerted signal combination, and means automatically operable upon the setting of said elements in such combination to initiate the operation of said device to be operated.

18. A radiant energy control system for initiating the operation of a power driven closure operator from a motor vehicle comprising, in combination, a transmitter adapted to be carried by the motor vehicle and having a sending antenna, said transmitter being operable to send a preconcerted combination of signal units, a receiver having a receiving antenna positioned so as to permit the motor vehicle to pass adjacent thereto, said receiver including a dector responsive to impulses transmitted by the transmitter, a selector mechanism including a plurality of selector elements adapted to be set in different combinations, electromagnetic means controlled by said detector to set said elements in a combination corresponding to the signal combination transmitted, and means for controlling the operation of the power driven operator upon the setting of said elements in said combination.

19. A radiant energy control system comprising a transmitter having a signal sending device with driving means therefor operable under manual control from a normal rest position through a predetermined cycle whereby to transmit a predetermined combination of signal units, a start-stop receiver having driving means also operable from a normal rest position through a predetermined cycle in timed relation with the sending device, said receiver including a detector responsive to radiant energy impulses transmitted by the sending device, electromagnetic means controlled by said detector and operable to initiate the operation of the driving means for the receiver, and a selecting mechanism also controlled by said electromagnetic means.

20. A radiant energy control system comprising a transmitter operable from a normal rest position through a predetermined cycle to send a preconcerted combination of radiant energy fields and space units, a receiver also operable from a normal rest position through a predetermined cycle in timed relation with the transmitter, said receiver having a selecting mechanism with electromagnetic means differentially responsive to the individual units of the signal according to whether they are represented by energy fields or space units, said selecting mechanism having means operable by said electromagnetic means adapted to retain the individual characters of the signal units, and means operated under the control of said selector mechanism when operated in accordance with the preconcerted combination.

21. A radiant energy control system for initiating the operation of a power driven door operator from a motor vehicle, comprising a selecting mechanism including a series of selector elements adapted to be set in various combinations, means operable when said elements are set in a predetermined combination to effect the operation of said door operator, and signal responsive electromagnetic means operable under the control of the individual units of a signal transmitted from the motor vehicle to set the selector elements in such combination.

22. A radiant energy signalling system comprising, in combination, a selector mechanism having a series of selector elements, electromagnetic means for operating said elements in various combinations, a transmitter adapted to send a preconcerted combination of signal units in the form of radiant energy fields and space units, and a detector responsive to the transmitted signal and adapted to control said electromagnetic means whereby to arrange said selector elements in a combination corresponding to that of the transmitted signal, said electromagnetic means being also adapted to initiate the operation of the selector under the control of the initial energy field.

23. A radiant energy control system comprising, in combination, two separately operable closure members, power driven mechanism for operating said closure members, signal transmitting means operable to send two different control signals, and means responsive to said two signals to control the operation of said two doors by said power driven mechanism, the last mentioned means being operable under the control of one of the received signals to operate one of said doors and operable under the control of the other received signal to operate the other door.

24. The combination with an automotive vehicle to be housed in a garage having a door, of a power driven mechanism for actuating said door, an electric lighting circuit for said garage, a switch controlling said lighting circuit, a device on said vehicle for transmitting fields of radiant energy to form signals, means operable selectively at the will of the vehicle driver to cause said device to effect the transmission of either of two different signal combinations, and a selective receiving mechanism arranged to be controlled by said signal combinations and acting in response to each of said signal combinations to initiate the operation of said power driven mechanism and in response to a predetermined one of the signal combinations to actuate said switch and thereby control the condition of said lighting circuit as well as the operation of the door.

25. A radant energy control system comprising, in combination with a motor vehicle and a power driven closure operator to be controlled from said vehicle; a transmitter carried by the vehicle and adapted to transmit a preconcerted signal composed of radiant energy fields, a radiant energy receiver having a thermionic tube the filament and output circuit of which are energized from a source of alternating current, said tube being adapted to detect the transmitted signal and also serving to rectify the alternating current applied to said output circuit, electromagnetic means in said output circuit operating in response to said tube, and a selector mechanism controlled by said electromagnetic means and operable upon the reception of the transmitted signal combination to initate the operation of said door operator.

26. A radiant energy control system comprising, in combination with a motor vehicle and a power driven closure operator, a radio transmitter carried by the motor vehicle and operable from a normal rest position through a given operating cycle at a predetermined speed whereby to transmit a preconcerted signal combination, a receiver having a selecting mechanism, an electromagnet adapted to be connected with a source of alternating current of substantially constant frequency, an armature mounted for vibration at a rate corresponding to the frequency of the alternating current, means operable in the vibration of said armature to drive the selecting mechanism at a predetermined constant speed and in timed relation to the transmitter, and means operable under the control of the initial impulse of the received signal to close a circuit through said electromagnet and maintain it closed for a predetermined operating cycle.

In testimony whereof, I have hereunto affixed my signature.

HOWARD D. COLMAN.